United States Patent [19]

Englert et al.

[11] Patent Number: 4,720,426
[45] Date of Patent: Jan. 19, 1988

[54] REFLECTIVE COATING FOR SOLID-STATE SCINTILLATOR BAR

[75] Inventors: August O. Englert, Waukesha; Robert J. Lyons, Milwaukee; Charles F. Marks, New Berlin, all of Wis.

[73] Assignee: General Electric Company

[21] Appl. No.: 880,190

[22] Filed: Jun. 30, 1986

[51] Int. Cl.⁴ ............................................. B32B 15/00
[52] U.S. Cl. .................... 428/344; 428/354; 250/361 R; 250/367
[58] Field of Search .......... 250/361 R, 367; 428/344, 354, 355

[56] References Cited

U.S. PATENT DOCUMENTS

4,110,621 8/1978 Horn ........................ 250/361 R
4,491,732 1/1985 Pritzkow et al. ............ 250/366

Primary Examiner—Alexander S. Thomas
Attorney, Agent, or Firm—Thomas R. Morrison

[57] ABSTRACT

A multilayer film for coating an exterior of a scintillation detector bar includes a pressure sensitive adherent layer containing a percentage of a light-diffusing material therein for affixing to an external surface of the bar. A clear plastic layer separates the adherent layer from a specularly reflecting layer. A protective layer is disposed atop the specularly reflecting layer. The light-diffusing material and the specularly reflecting layer cooperate to retain light within the bar, direct light in random directions within the bar and block optical crosstalk between adjacent bars. A preform consisting of a single piece of film may be used for covering five sides of the bar.

11 Claims, 8 Drawing Figures

REFLECTIVE COATING FOR SOLID-STATE SCINTILLATOR BAR

BACKGROUND OF THE INVENTION

The present invention relates to solid state scintillator bars and, more particularly, to coatings for solid state scintillator bars for improving the light output therefrom.

Although the present invention may have more general applications, for concreteness, the invention is described in the environment of an X-ray computer tomography (CT) device.

A CT device employs a fan beam of penetrating radiation passing through a body to be studied and falling on an array of scintillation detectors. Each scintillation detector includes a material capable of emitting light when impinged on by the penetrating radiation and a light detector effective to produce an electrical signal in relation to the light it receives. The electrical signals from the array of scintillation detectors are processed in a computer to construct an image of the portion of the body being studied.

The sensitivity of scintillation detectors is particularly important when the body under study is a part of a living human since increased detector sensitivity permits completion of a given study with reduced radiation exposure.

Early scintillation detectors employing a gas with photomultipliers have given way to solid state scintillators using solid state light detectors. Modern solid state scintillation detectors such as disclosed, for example, in U.S. Pat. Nos. 4,491,732 and 4,525,628, the disclosures of which are herein incorporated by reference as background material, employ a parallelepiped bar of a suitable single-crystal or poly-crystalline scintillating material optically coupled to a photo detector such as, for example, a photo-diode, PIN diode, or photoresistor. Several suitable materials for scintillation bars and light detectors are recited in the referenced patents, and the particular ones employed have no limiting effect on the present invention.

The scintillator bars in a detector array are spaced closely together with one face, called the front face, receiving the radiation. Light emitted within a scintillator bar is transmitted for detection from the face, called the rear face, opposite the front face. Emission of light may take place anywhere within the irradiated volume and may pass in any direction. There is a consequent high probability that emitted light travels toward a face other than the rear face.

A scintillator bar is generally transparent. One technique for encouraging the emitted light to reach the rear face shown, for example in U.S. Pat. Nos. 4,535,243; 3,857,036 and 4,110,621, includes placing specular reflectors on some faces of the scintillator bar. Thus, light impinging on any of the mirrored faces is reflected back into the bar. Eventually, some of the reflected light reaches the rear face and be detected. Several types of loss occur in this process making the light output less than is desired. First, light striking a specularly reflecting surface at close to normal incidence may require many reflections before it reaches the rear face. A good reflector such as, for example, silver, reflects only about 95 percent of the incident light and absorbs the rest. Thus, about five percent of the light is lost on each reflection. After many reflections from the surfaces of the bar, very little of the light is left. Furthermore, practical scintillator materials are not ideally transparent. As a consequence, light is absorbed in each transit through the bar between reflections from the surfaces.

One technique for reducing the number of reflections within a scintillator bar replaces the specularly reflecting surface with a diffuse reflector such as, for example, a paint layer of titanium dioxide. As is well known, titanium dioxide acts as a scatterer of light rather than a reflector. Light impinging on it at normal incidence, for example, is emitted with a generally cosine distribution. Thus, a much greater proportion of the impinging energy is directed back into the bar at shallow angles effective for reaching the rear face with less interaction with the other faces.

Diffuse reflectors rely on the scattering of light by particles of high refractive index rather than on reflection. Thus a relatively thick coating is required to return most of the light to the scintillator bar. In addition, modern scintillator arrays arrange their scintillator bars in tight proximity without separators therebetween. Optical crosstalk between the scintillator bars is suppressed by making the surface coating substantially opaque. This also requires a relatively thick paint coating on the order of about 0.0014 inch. The opacity may be improved with a coating of an opaque material such as a metal.

Thickness uniformity of the paint coating is critical to performance of the array. To obtain it, the paint coating is hand finished using an abrasive, before applying the opaque coating. Such hand finishing is time consuming and risks damaging the product, thereby increasing the scrap rate.

OBJECTS AND SUMMARY OF THE INVENTION

It is an object of the invention to provide a scintillator bar and a coating therefor that overcomes the drawbacks of the prior art.

It is a further object of the invention to provide a coating for a scintillator bar having improved performance in directing light to a collecting face.

It is a still further object of the invention to provide a film for coating a scintillator bar providing improved light output of the scintillator bar.

It is a still further object of the invention to provide a method for reflective coating of a scintillator bar.

Briefly stated, the present invention provides a multilayer film for coating an exterior of a scintillation detector bar. The coating includes a pressure sensitive adherent layer containing a percentage of a light-diffusing material therein for affixing to an external surface of the bar. A clear plastic layer separates the adherent layer from a specularly reflecting layer. A protective layer is disposed atop the specularly reflecting layer. The light-diffusing material and the specularly reflecting layer cooperate to retain light within the bar, direct light in random directions within the bar, and block optical crosstalk between adjacent bars. A preform consisting of a single piece of film may be used for covering five sides of the bar.

According to an embodiment of the invention, there is provided a reflective coating for a scintillation bar comprising: an adherent layer for adhesion to a surface of the scintillation bar, the adherent layer including a substantially transparent adherent material containing a predetermined amount of a diffusely scattering material, a specularly reflecting layer outside the adherent layer, and a protective layer outside the specularly reflective layer.

According to a feature of the invention, there is provided a reflective film for coating a scintillation bar comprising: an adherent layer for adhesion to a surface of the scintillation bar, the adherent layer including a substantially transparent adherent material containing a predetermined amount of a diffusely scattering material, a specularly reflecting layer outside the adherent layer, a protective layer outside the specularly reflective layer, and a release layer on an inner surface of the adherent layer.

According to a still further feature of the invention, there is provided a scintillation bar for a scintillation detector comprising: a substantially parallelipiped bar of a solid state scintillation material, a reflective coating on at least one surface of the bar, the reflective coating including an adherent layer having a predetermined amount of a light-scattering material therein, the adherent layer being adhered to the at least one surface, a clear plastic layer on an outside surface of the adherent layer, and a specularly reflecting layer on an outside surface of the clear plastic layer.

According to a still further feature of the invention, there is provided a preform for a reflective layer on a scintillation bar comprising: a multilayer film having an adherent layer containing a predetermined amount of a light-diffusing material, a clear plastic layer on the adherent layer, a specularly reflecting layer on the clear plastic layer and a protective layer on the specularly reflecting layer, and the multilayer film having a shape for fitting at least two contiguous surfaces of the scintillation bar.

According to a still further feature of the invention, there is provided a method for providing a reflective layer on a scintillation bar comprising: mixing a predetermined amount of a diffusely reflecting material in a clear pressure sensitive adhesive, spreading the pressure sensitive material on a clear plastic layer, forming a specularly reflecting layer between the clear plastic layer and a protective layer, and adhering a surface of the pressure sensitive adhesive to a surface of the scintillation bar.

The above, and other objects, features and advantages of the present invention will become apparent from the following description read in conjunction with the accompanying drawing, in which like reference numerals designate the same elements.

DETAILED DESCRIPTION OF THE PREFERRED EMBODIMENT

Figure 1:
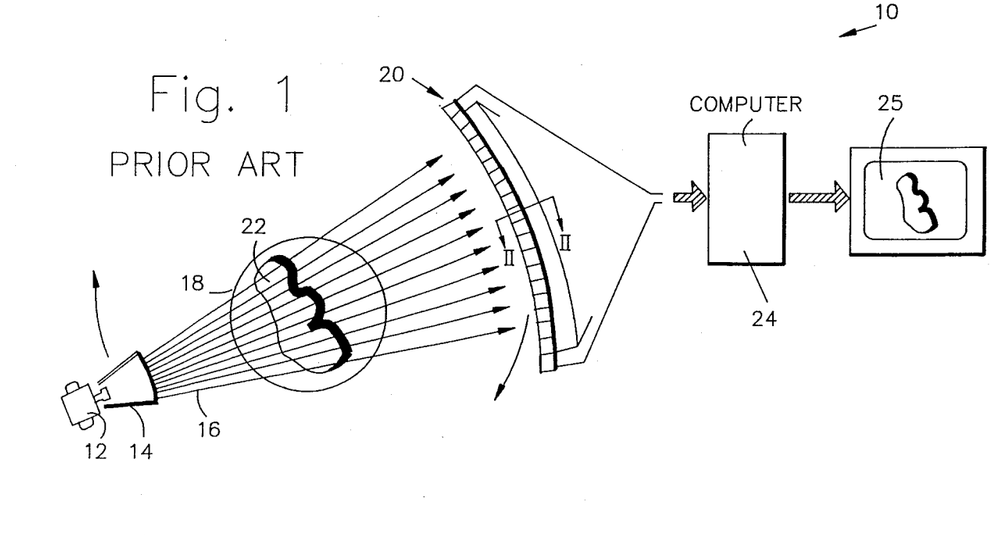
FIG. 1 is a simplified schematic diagram of a CT scanner employing an array of scintillator detectors.

Referring to FIG. 1, there is shown, generally at 10, a CT imaging system to which the present invention may be applied. An X-ray source 12, together with a collimator 14 produces a fan-shaped beam 16 which passes through a patient aperture 18 on its way to a scintillation detector array 20. A patient 22 in patient aperture 18 selectively absorbs the X radiation passing therethrough, whereby the outputs of individual scintillation detectors in scintillation detector array 20 are varied. At least one of X-ray source 12 and scintillation detector array 20 are rotated about patient 22 for producing a large number of data points. The outputs of all detectors in scintillation detector array 20 are applied to a computer 24 wherein the plurality of data points are analyzed by well-known methods for synthesizing an image for display on a display device 25 such as, for example, a cathode ray tube.

Figure 2:
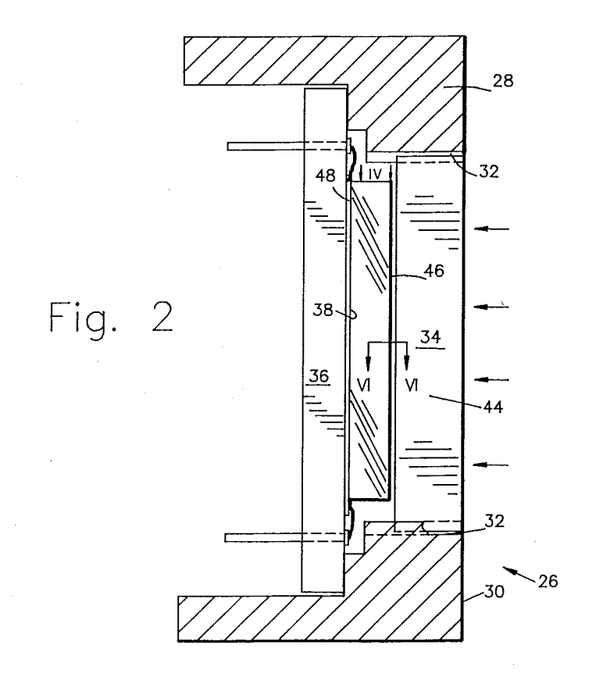
FIG. 2 is a cross section taken along II—II in FIG. 1.

Referring now to FIG. 2, a single scintillation detector cell 26 of scintillation detector array 20 is shown. Supports 28 and 30 contain a plurality of slots 32 each opposed pair of which receive the ends of a collimator bar 34 of a dense material such as, for example, tungsten. A support plate 36 includes a detector diode 38, attached to a front face thereof and, forward of detector diode 38, and in registry therewith, a scintillator bar 40.

Figure 3:
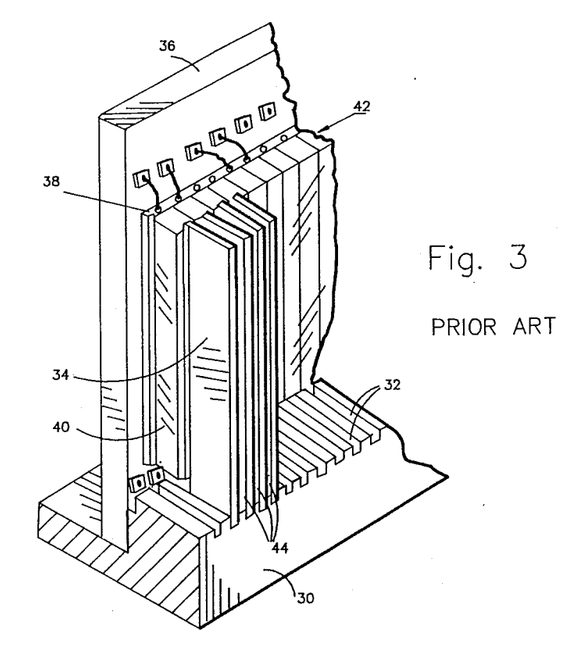
FIG. 3 is a perspective view of a portion of the array of FIG. 1 with certain elements omitted to reveal detail.

Referring now also to FIG. 3, from which support 28 is omitted for clarity, adjacent scintillator bars 40, and their associated detector diodes 38, are stacked close together on support plate 36 to form a detector module 42. Each collimator bar 34 is aligned with the interface between an adjacent pair of scintillator bars 40. Each adjacent pair of collimator bars 34 defines a detector channel 44.

X radiation, indicated by parallel arrows in FIG. 2, passes through a detector channel 44 to impinge upon a front face 46 of scintillator bar 40. Light is emitted within scintillator bar 40 for transmission through a rear face 48 to detector diode 38. A substantial distance is required between front face 46 and rear face 48, both to provide sufficient interaction with the X radiation, and to absorb a sufficient fraction of the radiation to protect detector diode 38. Thus, light emitted near front face 46 must find its way a substantial distance through scintillator bar 40 before detection.

Figure 4:
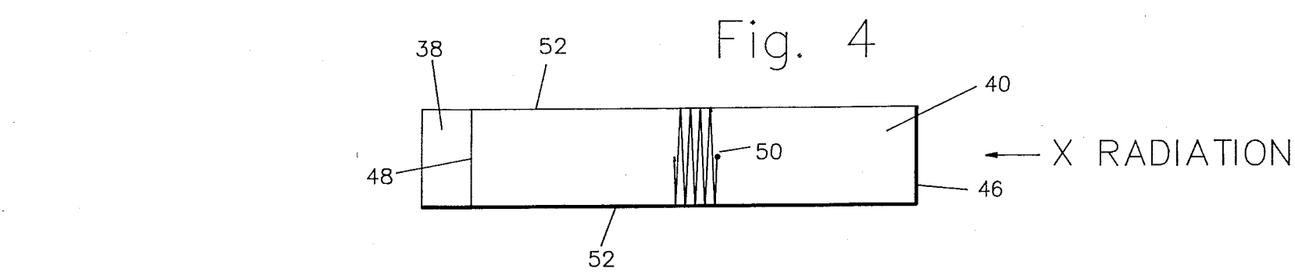
FIG. 4 is an end view of a scintillator bar having a specularly reflecting coating on its surface taken in a direction IV—IV in FIG. 2 and showing a multiply reflected light ray.

Referring now to FIG. 4, a top view of scintillator bar 40 illustrates a light path where side walls 52 are coated with a specular reflector. A quantum of light emitted from a location 50 and directed at near normal incidence to one side wall 52 is specularly reflected toward the opposed side wall 52 to impinge thereon at substantially the same incidence angle. So many reflections result that losses at each reflection, and absorption along each path, absorb substantially all of the light before it reaches rear face 48 for transmission to detector diode 38.

Figure 5:
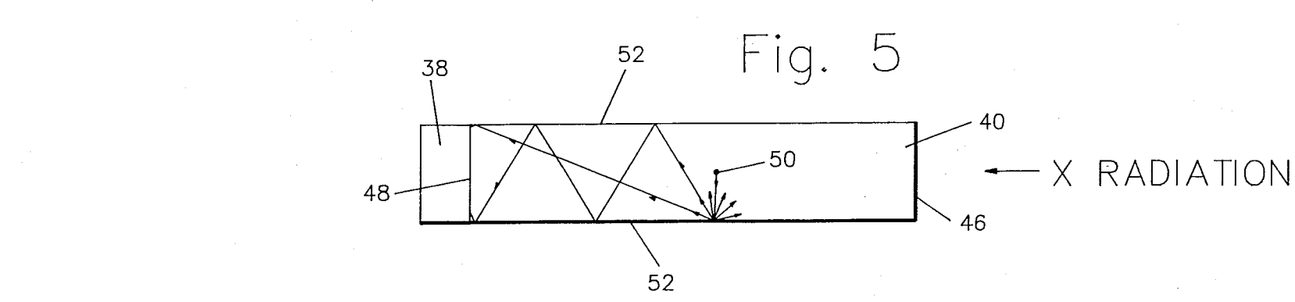
FIG. 5 is an end view of a scintillator bar corresponding to the view in FIG. 4 showing diffuse reflection of light from a surface thereof.

FIG. 5 shows a similar geometry except that, instead of a specular reflector on side walls 52, a diffuse reflector is provided. Light from location 50 impinging on side wall 52 is re-emitted in essentially random directions. As a consequence, a higher probability of diffusely reflected light reaching rear face 48 is obtained.

In the prior art, a diffusely reflecting layer of paint is applied to five sides of scintillator bar 40. The paint layer is thick enough, and contains sufficient diffracting particles, to achieve a light attenuation of about 98 percent at its outer surface contiguous to the next scintillator bar 40 in detector module 42. It is customary to include an outer opaque coating of paint or metal to block external transmission of light to the next scintillator bar 40 for reducing optical crosstalk.

Figure 6:
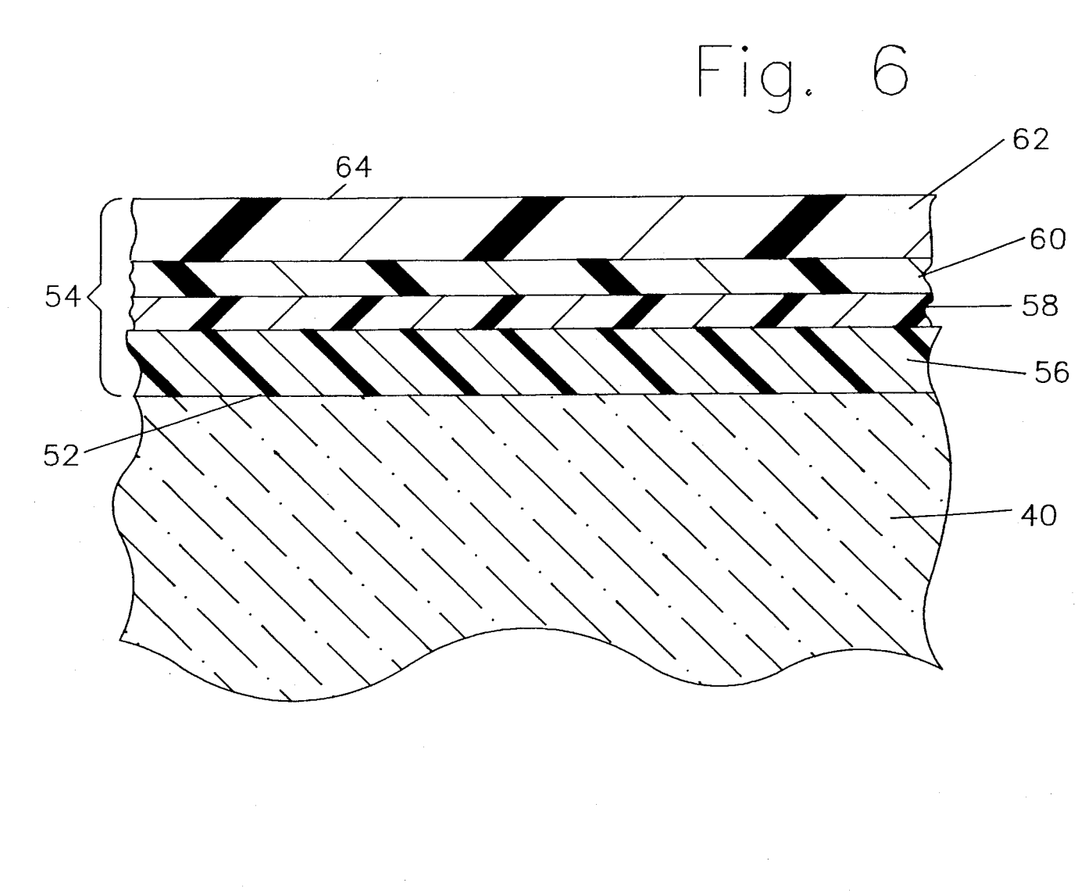
FIG. 6 is a cross section of a scintillator bar and reflective coating taken along VI—VI in FIG. 2.

Referring now to FIG. 6, a reflecting film 54 is disposed on a surface such as, for example, side wall 52 of scintillator bar 40. Reflecting film 54 includes an adherent layer 56 containing a small percentage by weight of diffusing particles such as, for example, titanium dioxide. A clear layer 58 of a plastic having a suitably low index of refraction is disposed upon adherent layer 56. A specularly reflecting layer 60 atop clear layer 58 reflects any light having passed through adherent layer 56 and clear layer 58 back toward side wall 52. A protective layer 62 lies atop specularly reflecting layer 60. When scintillator bar 40 is assembled into detector module 42, an outer surface 64 of protective layer 62 abuts a corresponding outer surface (not shown) of the reflecting film 54 on the adjacent scintillator bar 40.

Adherent layer 56 is any suitable clear pressure-sensitive adhesive having mixed therein diffusing particles. In the preferred embodiment, adherent layer 56 is a clear acrylic pressure sensitive adhesive having from about 10 to about 30 percent by weight of titanium dioxide uniformly dispersed therein. This amount of titanium dioxide is insufficient to attenuate fully the light in its passage therethrough. Thus, reflection by specularly reflecting layer 60 is relied on to return the light passing through adherent layer 56 toward side wall 52.

The maximum amount of titanium dioxide in adherent layer 56 is limited by its effect on the properties of the adhesive in adherent layer 56. As more titanium dioxide is added to the material of adherent layer 56, the mixture becomes more viscous and more difficult to spread in a uniform thin layer. In addition, its tackiness, or ability to adhere to side wall 52, decreases. We have found that a weight percent of from about 10 percent to about 30 percent, and most preferably, about 20 percent, in adherent layer 56 is a preferred value giving sufficient light diffusion and retaining satisfactory mechanical properties. The thickness of adherent layer 56 is preferably within about 10 percent of about 0.0005 inch. The thickness of adherent layer 56 and its percentage of titanium dioxide can be traded off to achieve comparable results.

Clear layer 58 is a clear plastic material, and most preferably a clear acrylic material having an index of refraction at least as low as the plastic material serving as a binder in adherent layer 56. Clear layer 58 is preferably within about 10 percent of about 0.0001 inch thick. The low refraction index of clear layer 58 enhances the action of specularly reflecting layer 60.

Any convenient technique may be employed for applying adherent layer 56 and clear layer 58. For example, any of the following may be suitable: roll coating, doctor blading, silk screening, flame spraying, liquid spraying, sintering, vapor deposition, spin coating and powder coating. The coating process selected must be one which is capable of producing a layer having the required uniformity.

Specularly reflecting layer 60 is preferably metallic and most preferably silver. Gold or aluminum may be used with the possibility of a reduction in light output.

Protective layer 62 is preferably of a polyester having a thickness of within about 10 percent of about 0.0005 inch.

The total thickness of reflecting film 54 is about 0.0011 inch with a tolerance of about 10 percent. This is a thinner layer and offers improved uniformity and repeatability than is attainable with prior methods. In addition, substantially complete absence of optical crosstalk between adjacent scintillator bars 40 is achieved.

In one embodiment of the invention, specularly reflecting layer 60 is coated on the surface of clear layer 58. Such a product is commercially available and provides satisfactory operation. We have discovered, however, that when reflecting film 54 is wrapped around the corner of scintillator bar 40, specularly reflecting layer 60, being disposed on the outside of the bend, may crack in the vicinity of the corners and thus offer reduced reflectivity.

In an improved embodiment, specularly reflecting layer 60 is coated on the inner surface of protective layer 62 by conventional methods such as, for example, by sputtering, before affixing clear layer 58 and adhesive layer 56 thereto. With this structure, specularly reflecting layer 60 is on the inside of the bend at corners and avoids cracking.

As is well known, total internal reflection occurs at a polished surface for angles of grazing incidence when the index of refraction outside the surface is smaller than the index of refraction of the material inside the surface. Thus, side wall 52 may be polished to improve light output.

Figure 7:
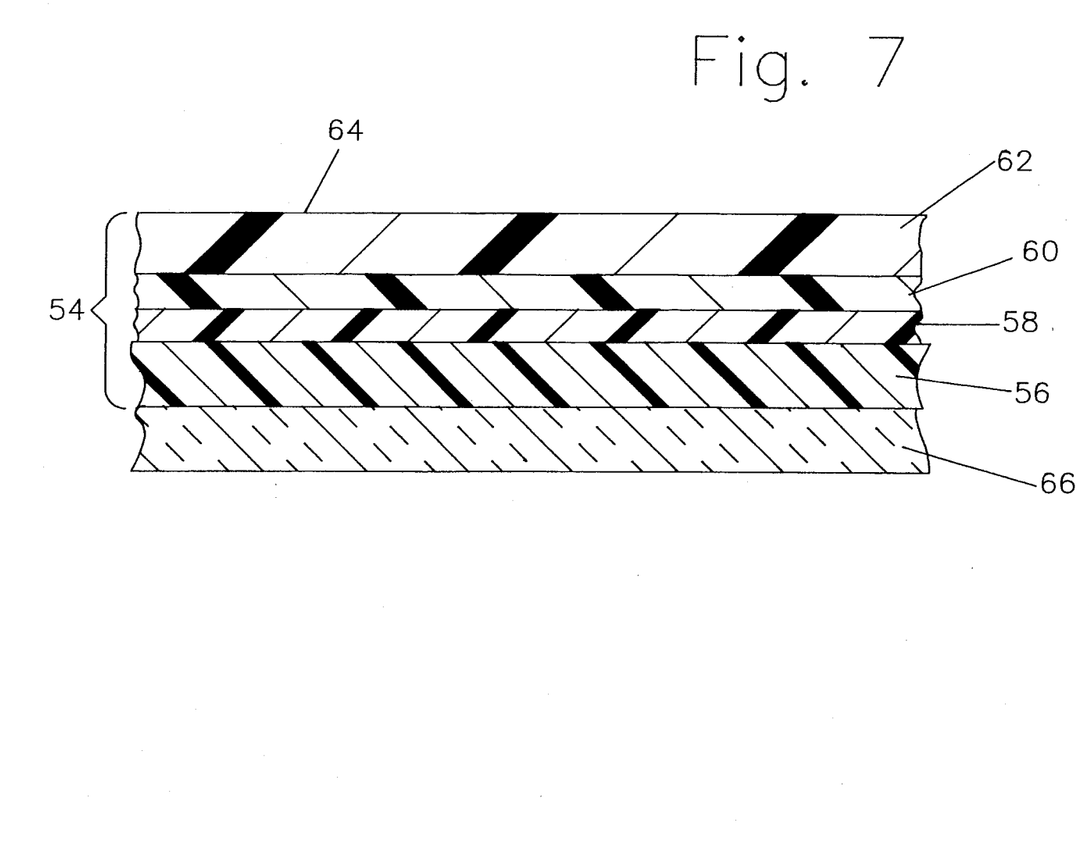
FIG. 7 is a cross section of a reflecting film for a scintillator bar including a release layer thereon.

Referring now to FIG. 7, until ready for use the surface of adherent layer 56 is covered by a conventional release layer 66 to protect such surface from dirt, and resultant loss of tackiness, until ready for application to a scintillator bar 40. Release layer 66 may be, for example, a paper treated with a silicone material to limit its adhesion to adherent layer 56.

Figure 8:
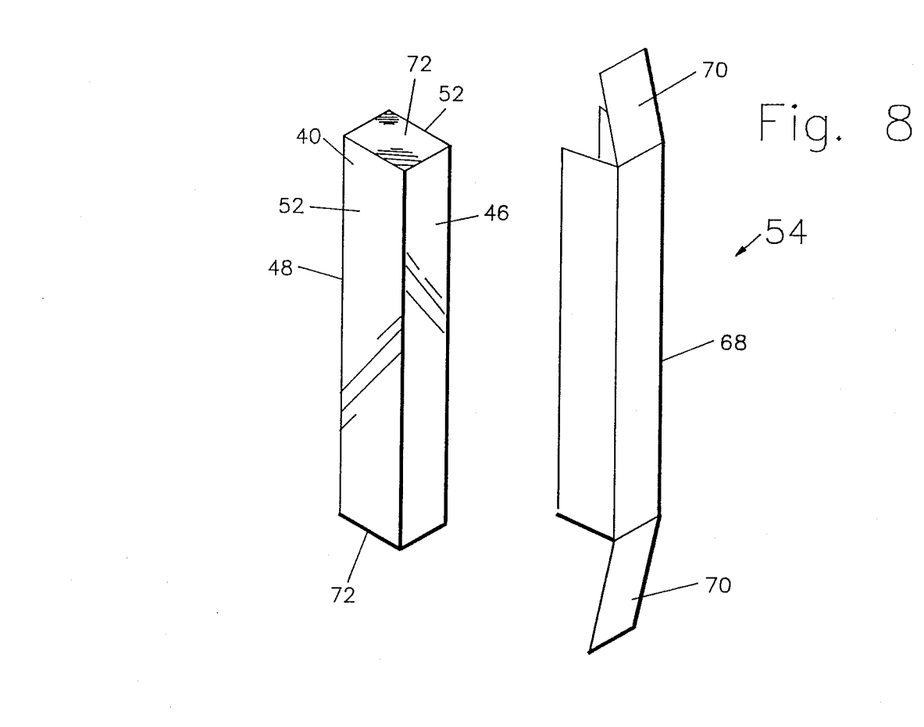
FIG. 8 is a perspective view of a scintillation bar and a preform of a reflecting film for coating five sides of the scintillator bar.

Referring now to FIG. 8, reflecting film 54 may be cut into a preform 68 to fit the five sides of scintillator bar 40 to which it is applied. Notches are removed at each end to leave a tab 70 at each end. The main portion of preform 68 is wrapped about front face 46 and side walls 52 and tabs 70 are bent into adhering contact with ends 72 of scintillator bar 40. In the alternative, tabs 70 may be omitted and ends 72 may be treated separately using, for example, a separate piece of reflecting film 54. Ends 72 may be treated using prior-art methods of a paint layer since thickness and uniformity have less effect in these locations and optical crosstalk between ends 72 of adjacent scintillator bars 40 is not a problem.

The use of the term "adherent layer 56" should not be taken to preclude materials other than a pressure-sensitive adhesive in such layer. For example, adherent layer 56 may include a curable material capable of being cured by any conventional means into adherence to scintillator bar 40. In addition, an intermediate layer (not shown) may be employed to provide the required adherence. These alternatives should employ materials having suitable optical properties according to the foregoing disclosure.

Having described preferred embodiments of the invention with reference to the accompanying drawings, it is to be understood that the invention is not limited to those precise embodiments, and that various changes and modifications may be effected therein by one skilled in the art without departing from the scope of the invention as defined in the appended claims.

The invention claimed is:

1. A reflective coating for a scintillation bar comprising:
   an adherent layer for adhesion to a surface of said scintillation bar;
   said adherent layer including a substantially transparent adhesive material containing means for diffusely scattering a predetermined portion of light passing therethrough; and
   means outside said adherent layer for specularly reflecting light passing through said adherent layer back into said adherent layer.

2. A reflective coating according to claim 1 wherein:
   a protective layer is disposed outside said means for specularly reflecting; and
   said means for specularly reflecting includes a specularly reflecting layer coated on an inside surface of said protective layer.

3. A reflective coating according to claim 1, further comprising a clear layer between said adherent layer and said means for specularly reflecting.

4. A reflective coating according to claim 3 wherein:
   a protective layer is disposed outside said means for specularly reflecting; and
   said means for specularly reflecting includes a specularly reflecting layer coated on an inner surface of said protective layer.

5. A reflective coating according to claim 3 wherein said means of specularly reflecting is coated on an outside surface of said clear layer.

6. A reflective coating according to claim 1 wherein said transparent material is an adhesive material and said adhesive material has an index of refraction substantially lower than an index of refraction of said scintillator bar.

7. A reflective coating according to claim 6 further comprising a clear layer between said adherent layer and said means of specularly reflecting, and said adhesive material and said clear layer both have indices of refraction lower than said scintillation bar.

8. A reflective coating according to claim 1 wherein said predetermined amount is between 10 and 30 weight percent of said adherent layer.

9. A reflective coating according to claim 1 wherein said means of specularly reflecting is silver.

10. A reflective coating according to claim 1 wherein said transparent material is a pressure sensitive adhesive.

11. A reflective coating according to claim 1 wherein said transparent material is a curable material curable into adhesive with said surface of said scintillator bar.

* * * * *